(12) United States Patent
Rollmann et al.

(10) Patent No.: US 7,124,708 B2
(45) Date of Patent: Oct. 24, 2006

(54) SUPPORT FOR FORMED BIRD TREAT AND METHOD THEREFOR

(75) Inventors: John A. Rollmann, Chilton, WI (US); Alan M. Mueller, Chilton, WI (US)

(73) Assignee: Kaytee Products, Inc., Chilton, WI (US)

( * ) Notice: Subject to any disclaimer, the term of this patent is extended or adjusted under 35 U.S.C. 154(b) by 0 days.

(21) Appl. No.: 11/338,094

(22) Filed: Jan. 23, 2006

(65) Prior Publication Data

US 2006/0118053 A1 Jun. 8, 2006

Related U.S. Application Data

(62) Division of application No. 10/136,206, filed on Apr. 30, 2002.

(60) Provisional application No. 60/323,181, filed on Sep. 18, 2001.

(51) Int. Cl.
*A01K 39/01* (2006.01)

(52) U.S. Cl. .................. 119/51.03; 119/57.8
(58) Field of Classification Search ............. 119/51.03, 119/57.8; 426/134
See application file for complete search history.

(56) References Cited

U.S. PATENT DOCUMENTS

| | | | | |
|---|---|---|---|---|
| 2,963,147 | A * | 12/1960 | Stagner | 206/493 |
| 6,085,691 | A * | 7/2000 | Loehndorf | 119/51.01 |
| 6,499,429 | B1 * | 12/2002 | Hein | 119/51.03 |
| 6,941,892 | B1 * | 9/2005 | Johnson | 119/57.8 |

* cited by examiner

*Primary Examiner*—Robert P. Swiatek
(74) *Attorney, Agent, or Firm*—Godfrey & Kahn, S.C.

(57) ABSTRACT

A support structure for a pet, wild bird or small animal treat which includes a stem having a first end and a second end. At the first end there is a disk and hanger that fit into a mold. At the second end is a branch member perpendicular to the stem. Food is packed into the mold so that is surrounds the stem and branch. The resulting treat is removed from the mold for packaging.

5 Claims, 3 Drawing Sheets

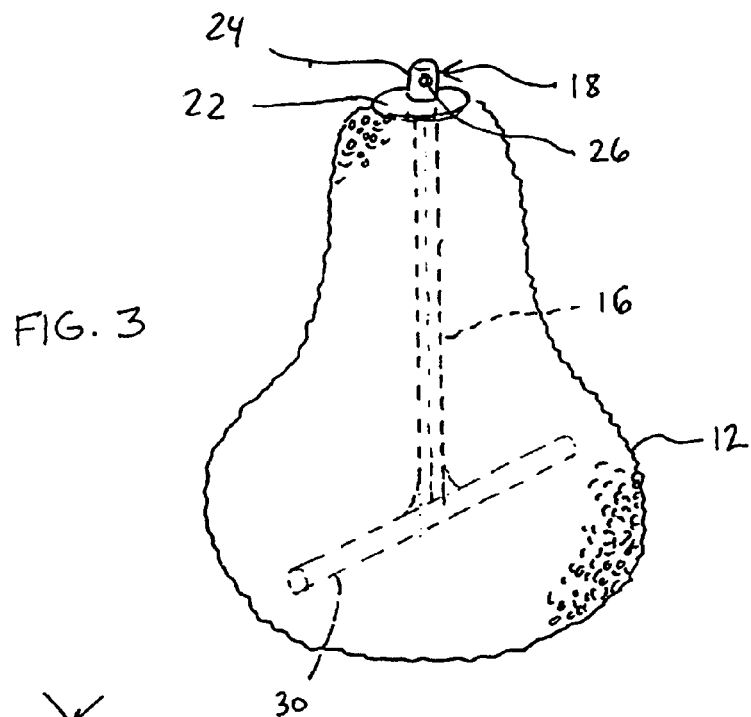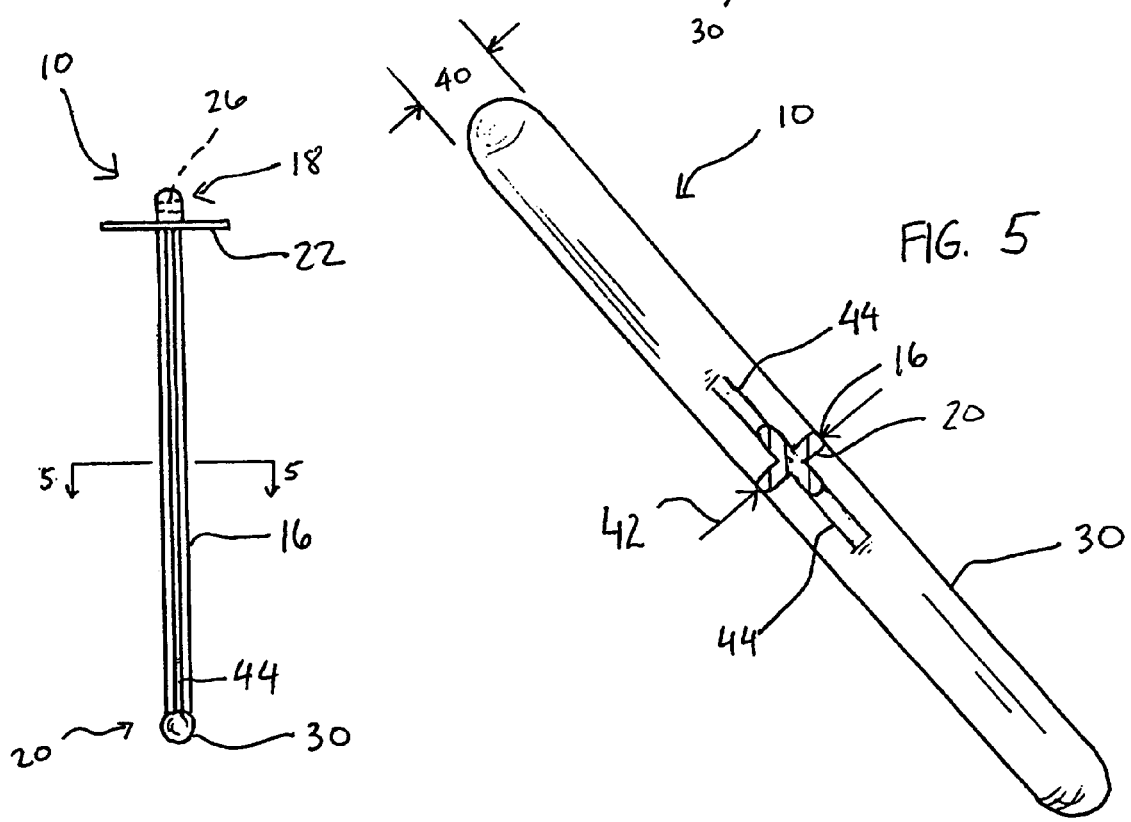

SUPPORT FOR FORMED BIRD TREAT AND METHOD THEREFOR

CROSS REFERENCE TO RELATED APPLICATIONS

This application is a divisional application of U.S. application Ser. No. 10/136,206, filed on Apr. 30, 2002, which claimed priority benefit under 35 U.S.C. ¶119(e) based on a co-pending U.S. application Ser. No. 60/323,181, filed on Sep. 18, 2001.

FIELD OF THE INVENTION

This invention relates generally to the field of bird feeders, and particularly to structures which can be utilized to hang wild bird treats formed from grains, seeds, fruits and/or nuts.

BACKGROUND OF THE INVENTION

Bird treats such as bird bells which are formed from a combination of seeds (i.e. white millet, sunflower, red millet, milo), grains, bits of fruit and/and or nuts, and which are held together by a dried sticky material such as honey or dextrose, are commonly used to feed and attract wild bird species. Bird bells present a particularly difficult problem to support properly, in that they are loosely "glued" together since they are designed to feed birds. In the past, form-fitting net-type sacks have been utilized for hanging the treats.

In accordance with U.S. Pat. No. 5,033,708 to Brue et al., another type of bird treat support has been used which includes a disk for supporting the bottom of a bird bell, and a separate hanging tab that is connected to the disk and inserted into an axial slot within the bird bell. A top portion of the tab extends out above the bird bell for hanging. The hanging tab includes an aperture by which the bell support and bird bell may be hung. Centrally located in the disk is a slot into which a widened lower end of the hanging tab may be inserted and twisted to thereby connect to the disk. It has been found, however, that this two-piece construction can be comparatively expensive, and it is possible for the hanging tab and disk to become separated if they rotate with respect to each other, thereby allowing the bird bell to fall. Additionally, the bird bell cannot be molded around the support as it is formed, thus requiring a two-step manufacturing process of filling the mold and attaching the support to the molded treat.

Another type of bird treat support is disclosed in U.S. Pat. No. 5,323,995 to Grittman et al. This support is a unitary piece, having a movable suspension member at one end, connected to a stem with a hole at an opposite end. While this support is less expensive to manufacture and assemble than the two-piece design, it still requires a two-step manufacturing process.

Yet another type of bird treat support is disclosed in U.S. Pat. No. 6,085,691 to Loehndorf. A support structure to which a conglomeration of small animal food can be formed includes a stem having a top and bottom plate at opposite ends thereof. The top plate includes a hanging clip capable of securing the support to a small animal cage or other support structure. The bottom plate may have a securing clip capable of better securing the support to the cage. In order to improve the ability of the support structure to retain the conglomeration thereon when an animal picks at it, a plurality of protuberances are disposed along the length of the stem. Small animal food is disposed about the stem in the molding process, so that it is between the top and bottom plates. While this patent discloses a support that is used in one step molding process, it can only be used for shapes that allow the mold to be filled from the side of an elongated shape, not from an end. Therefore, for shapes such as a bell, ball, column or any other shape that does not have a flat side, this particular support cannot be used because such shapes are necessarily filled from one end.

Accordingly, a need exists for a bird treat support that is simple, relatively inexpensive and is inserted during the molding process.

SUMMARY OF THE INVENTION

The present invention is a support structure to which food for pets, wild birds or small animals can be affixed using a binding material. The support structure is a stem with top and bottom ends. A top plate or disk is disposed on the top end of the stem in a plane substantially perpendicular to the stem, the top plate having a hanger protruding therefrom. A bottom branch is disposed on the bottom end of the stem in a plane substantially perpendicular to the stem. To provide structural support during the molding process, a pair of fillets are integrally connected between the branch and the stem. This feature resists moment forces applied to the branch in a direction substantially parallel to the stem.

The present invention further includes a method for forming a treat for pets and/or wild birds or small animals using the support structure. The present invention calls for a treat mixture of food, a binding material, and a mold. The mold for the treat has a predetermined shape and an opening for receiving the treat mixture. The support structure is inserted into the mold so that the branch is adjacent the mold opening. The mold is then filled with the treat mixture so that it surrounds the support structure stem and bottom branch to form the treat. The treat can then be removed from the mold so it can be packaged for sale.

While the present invention is particularly useful for bird treats, other applications are possible and references to use with birds should not be deemed to limit the application of the present invention. The present invention may be advantageously adapted for use where similar performance capabilities and characteristics are desired, such as with pet or small animal treats (i.e. squirrel, rabbit, hamster, gerbil or the like). These and other objects and advantages of the present invention will become apparent from the detailed description, claims, and accompanying drawings.

BRIEF DESCRIPTION OF THE DRAWINGS

FIG. 3 is a perspective view of the support structure and birdseed product shown in FIG. 2;

FIG. 4 is a side elevational view of the support structure of FIG. 1;

FIG. 5 is a top cross-sectional view of the support structure, taken along line 5—5 in FIG. 4;

DESCRIPTION OF THE PREFERRED EMBODIMENTS

Figure 1:
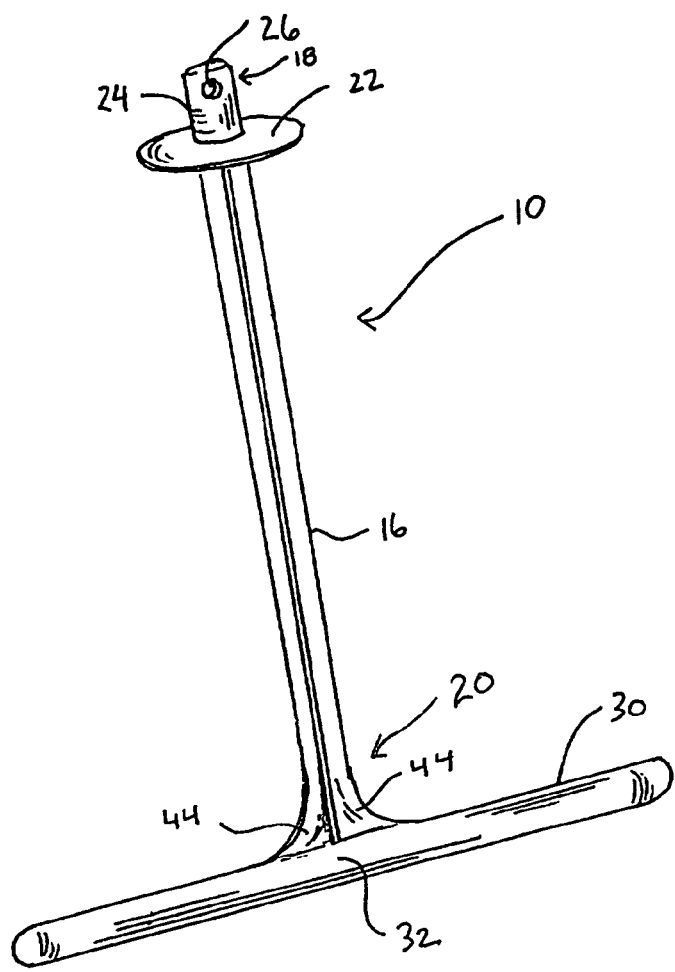
FIG. 1 is a front perspective view of the support structure of the present invention.
Figure 2:
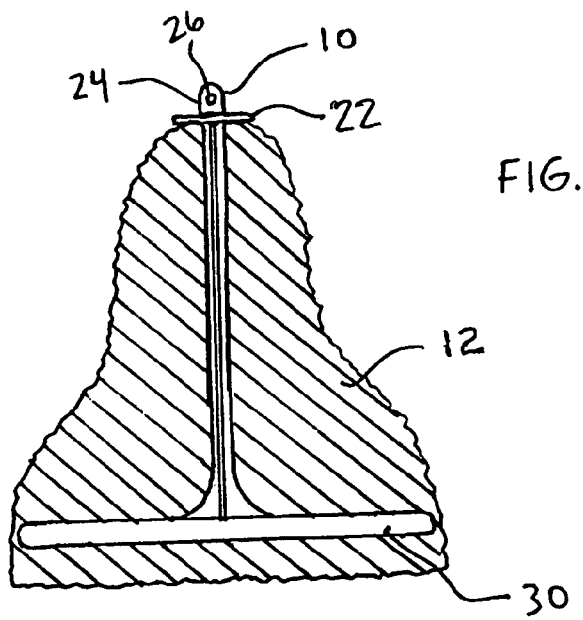
FIG. 2 is a cross-sectional side view of a birdseed product formed around the support structure of FIG. 1.

Referring more particularly to the drawings, the support structure of the present invention is designated generally by the numeral 10 in FIG. 1. As shown in FIG. 2, the support structure 10 is operable to support an object of interest which may take on the form of a source of food for pets, wild birds or small animals, such as the bell-shaped birdseed product 12. The support structure 10 is operable to position the object of interest in a selected, suspended position relative to another supporting surface or structure such as a branch of a tree, or other structure (not shown).

For illustrative convenience only, the support structure of the present invention is shown and described herein as it would be configured if it were utilized to support a source of food for pets, small animals and/or wild birds such as the birdseed product 12, shown in FIG. 2. However, it should be recognized that the apparatus of the present invention can be utilized in a variety of different environments for purposes of displaying or supporting various objects of interest for various commercial or other purposes.

As best seen by reference to FIG. 1, the support structure 10 of the present invention includes a substantially T-shaped body, with a stem 16 having a first end 18, and an opposite second end 20. Located at the first end 18 is a substantially planar disk 22 positioned in any plane that is transverse to stem 16, and preferably, substantially perpendicular to stem 16. Disk 22 could be of any shape (i.e. heart, square or triangle), and the mold described herein shaped to accommodate the disk shape.

Extending from disk 22 is a hanger, preferably in the form of a boss 24 that preferably has an aperture 26 located therethrough for receiving a hook or cord (not shown), or the like for hanging. The boss may be a column-shaped member substantially aligned with a longitudinal axis of the stem. Alternatively, boss 24 may be omitted, and disk 22 could have a decorative or functional shape extending upwardly therefrom (e.g. Christmas tree, Santa, or a hook.) The decorative shape would have an aperture 26 therein for hanging purposes, and the mold described herein designed to accommodate such a shape.

Located at the second end 18 is a branch 30. As seen in FIG. 3, branch 30 is connected to stem 16 at a midpoint 32. However, the shape of birdseed product 12 may be such that stem 16 is connected at a number of different locations along the length of branch 30. For example, a Christmas stocking shape would likely have a support structure 10 that is L-shaped rather than T-shaped. Preferably, the branch has a smooth surface so a conglomeration of food (i.e. birdseed) and binding material does not get hung up on the branch as the lower part of the mold (described herein) is filled.

As seen in FIGS. 3–5, the stem 16 is preferably made with a cross-shaped cross-section. The reason for this shape is twofold. First, it requires less material in manufacture, and second, it has more surface area than a cylindrical shaped stem. The advantage of a stem with more surface area is that the birdseed product 12 has a larger surface for adherence. It should be understood that various other cross-sectional shapes can be used instead of a cross-shape, i.e. a star. Another option would be to have a stem with various protuberances along its length.

As best seen in FIG. 2, the length of branch 30 is slightly less than the width dimension of the corresponding birdseed product 12. However, branch 30 could be shorter than what is shown, or be as long as the width dimension of birdseed product 12. Branch 30 could also extend beyond the width of the birdseed product 12, and the mold described herein adjusted to accommodate the longer branch. Referring to FIG. 5, preferably, the diameter 40 of branch 30 is substantially equal to the width 42 of stem 16. This allows easier and more complete filling of the mold, as described herein.

In the most preferred embodiment stem 16 includes at least one fillet 44 extending between the stem 16 and the branch 30, and preferably, one fillet 44 on each side of stem 16. Fillet(s) 44 can prevent permanent deformation of branch 30 or stem 16 during the molding process. Fillet(s) 44 provide enough stiffness to the structure 10 so as the birdseed or pet/small animal food is completely packed into the mold (described herein), branch 30 retains a desired position. Branch 30 is most preferably positioned substantially perpendicular to stem 16.

Support 10 is a unitary member that is preferably made from injection-molded plastic. This plastic has a stiffness that may permit some elastic flexure of the support structure 10 as the mold is packed, but resists moment forces applied to the branch 30 in a direction substantially parallel to a longitudinal axis of the stem 16. However, the plastic will not permit enough flexure to occur so that the birdseed product is formed around a deformed support structure 10.

Figure 6:
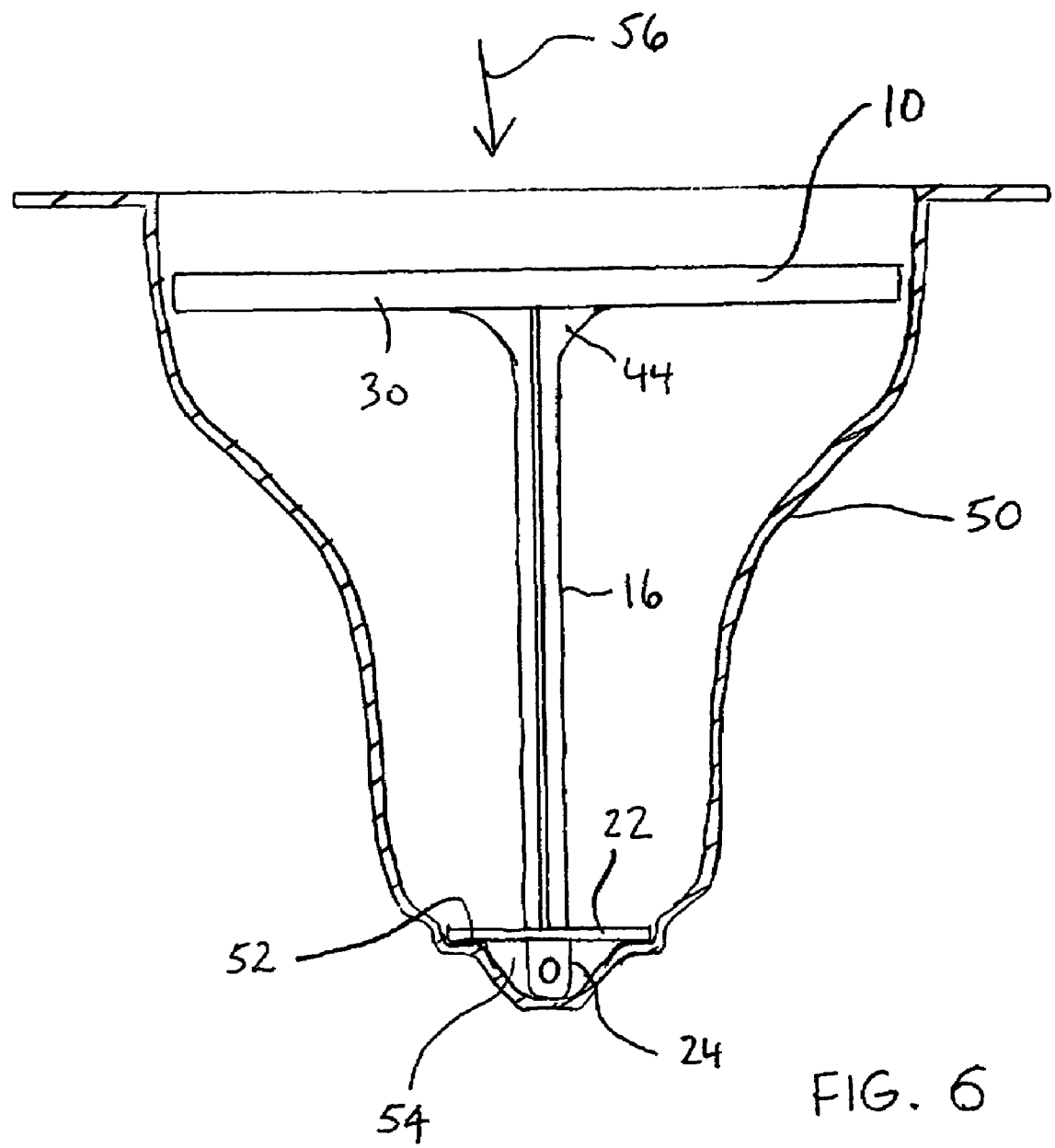
FIG. 6 is a cross-sectional side view of a mold with the support structure of FIG. 1 supported therein.

Referring now to FIG. 6, the treat for pets, small animals or birds such as birdseed product 12 is molded as follows. First, a support structure 10 is inserted into a mold 50 so that it remains relatively stationary thereto. The mold is designed so that it guides the support structure 10 into the proper position with a loose fit and supports it in that position when the mold 50 is held vertically with its open end 56 in an upright position. Specifically, there is a flat annular surface 52 inside the bottom portion 53 of mold 50 to support disk 22. Adjacent the flat annular surface 52, there is a depression 54 to accommodate boss 24. There may be enough space between the walls of the mold 50 and each end of branch 30 to allow some movement of the support structure 10. Alternatively, support structure 10 could be rigidly supported by mold 50 so that no lateral movement occurs, for instance if support structure 10 fits into the mold with a slip or friction fit (not shown).

A mixture of small food pieces such as food pellets, nuts, grains, dried fruits, minerals and bird seed such as millet, sunflower seeds etc. is combined with a binding material. This binding material causes the small animal food to stick together and retain whatever shape in which it is molded. The binding material typically consists of a combination of gelatin, honey, sugar, corn syrup or the like. This conglomeration of small animal food and binding material is packed into the opening 56 of the mold so that it surrounds stem 16 and branch 30. Preferably, the conglomeration is tightly packed so that there are no substantial air pockets around stem 16 and branch 30 other than those inherently resulting from the packing density of the food. The lack of substantial air pockets increases the structural integrity of the birdseed product 12. Packing density depends on the type of food used to make the birdseed product 12. For example, a birdseed product 12 made from millet may have a higher packing density than one made from sunflower seeds. There may, however, be a small detent (not shown) on the exterior surface at each end of branch 30. The final birdseed product 12, shown in cross section in FIG. 2, with support structure 10 is removed from the mold and packaged for sale.

Although the invention has been herein shown and described in what is perceived to be the most practical and preferred embodiments, it is to be understood that the invention is not intended to be limited to the specific embodiments set forth above. Accordingly, it is recognized that modifications may be made by one skilled in the art of the invention without departing from the spirit or intent of the invention and therefore, the invention is to be taken as including all reasonable equivalents to the subject matter of the appended claims.

What is claimed is:

1. A mold and a molded treat for pets, wild birds or small animals, the mold and molded treat comprising:
   a support structure comprising a stem having top and bottom ends;
   a disk disposed on the top end of the stem in a transverse plane, the disk having a hanger protruding therefrom; and
   a mixture of small food pieces and a binding material formed around the support structure in a predetermined shape,
   a branch disposed transversely at the bottom end of the stem in a transverse plane, and shaped so that the food pieces can be packed around the branch so that no substantial air pockets are formed, the branch being fully surrounded by said mixture;
   the mold including an open first end and a second opposite end, the first end sized to receive the support structure with the branch adjacent the first end within the mold and the second end configured to receive the disk and hanger;
   the treat formed within the mold by directing the food pieces and a binding material through the first end of the mold past the branch and toward the disk in a direction substantially parallel to the stem.

2. The molded treat of claim 1, wherein the branch has at least one fillet integrally connected between the branch and the stem so that moment forces applied to the branch in a direction substantially parallel to the stem are resisted.

3. The molded treat of claim 1, wherein the branch has a substantially smooth surface that does not collect bits of food.

4. The molded treat of claim 1, wherein the stem has a cross-shaped cross-section.

5. The molded treat of claim 1, wherein the hanger is a column-shaped boss substantially aligned with a longitudinal axis of the stem, the boss having a hole therein for hanging the support structure.

* * * * *